US008010443B2

(12) United States Patent
Triplett

(10) Patent No.: US 8,010,443 B2
(45) Date of Patent: *Aug. 30, 2011

(54) SYSTEM AND METHOD FOR CHANGING THE VIEW OF A TRADING SCREEN

(75) Inventor: Mark W. Triplett, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/906,101

(22) Filed: Oct. 17, 2010

(65) Prior Publication Data

US 2011/0029426 A1 Feb. 3, 2011

Related U.S. Application Data

(63) Continuation of application No. 12/714,643, filed on Mar. 1, 2010, now Pat. No. 7,917,428, which is a continuation of application No. 11/415,967, filed on May 2, 2006, now Pat. No. 7,769,671, which is a continuation of application No. 10/787,481, filed on Feb. 26, 2004, now Pat. No. 7,761,362.

(51) Int. Cl.
*G06Q 40/00* (2006.01)
(52) U.S. Cl. ........................................................ 705/37
(58) Field of Classification Search .................. 705/37
See application file for complete search history.

(56) References Cited

U.S. PATENT DOCUMENTS

| 5,596,347 | A | * | 1/1997 | Robertson et al. ............ 715/856 |
| 5,787,411 | A | | 7/1998 | Groff et al. |
| 5,799,287 | A | | 8/1998 | Dembo |
| 5,801,679 | A | * | 9/1998 | McCain ........................ 715/856 |
| 5,835,916 | A | * | 11/1998 | Inaki et al. .................... 715/212 |
| 5,884,016 | A | * | 3/1999 | Allen et al. ................... 345/419 |
| 6,262,728 | B1 | * | 7/2001 | Alexander ................. 345/440.1 |
| 6,321,158 | B1 | * | 11/2001 | DeLorme et al. ............. 701/201 |
| 6,772,132 | B1 | | 8/2004 | Kemp, II et al. |
| 6,993,504 | B1 | | 1/2006 | Friesen et al. |
| 7,127,424 | B2 | | 10/2006 | Kemp, II et al. |
| 7,228,289 | B2 | * | 6/2007 | Brumfield et al. .............. 705/35 |
| 7,389,268 | B1 | | 6/2008 | Kemp, II et al. |
| 7,587,357 | B1 | | 9/2009 | Buck |
| 2002/0099644 | A1 | * | 7/2002 | Kemp et al. .................... 705/37 |
| 2002/0125328 | A1 | | 9/2002 | Sukeda et al. |

(Continued)

OTHER PUBLICATIONS

Maloney et al.: A web display and access point to the FAA's integrated terminal weather system (ITWS), 2002-2004, pp. 1-4.*

(Continued)

*Primary Examiner* — Bijendra K. Shrestha
(74) *Attorney, Agent, or Firm* — McDonnell Boehnen Hulbert & Berghoff LLP

(57) ABSTRACT

A trading screen displays market information, such as working orders, buy and sell orders, and other items of interest, in association with values on a value axis. Each item of interest is therefore displayed in relation to the value axis to provide a trader with an intuitive display of the market. In one embodiment, a user can select a location associated with a particular value on the trading screen and upon an selection, for example, by a click of the mouse button, the value axis is repositioned so that the selected value is moved to a predefined location. During which, market information is moved to new locations that are associated with their respective values on the value axis.

21 Claims, 5 Drawing Sheets

U.S. PATENT DOCUMENTS

| | | | |
|---|---|---|---|
| 2003/0023536 A1* | 1/2003 | Hollerman et al. | 705/37 |
| 2003/0097323 A1 | 5/2003 | Khalfan et al. | |
| 2003/0229900 A1* | 12/2003 | Reisman | 725/87 |
| 2005/0108653 A1* | 5/2005 | Langridge | 715/771 |
| 2006/0259398 A1* | 11/2006 | Singer | 705/37 |

OTHER PUBLICATIONS

GNU Emacs Manual—Controlling the Display, 2001, pp. 1-5, http://www.promotionalpromos.com/mirrors/gnu/old-gnu/Manuals/emacs-20.7/html_chapter/emacs_15.html.*

Prime Charts: Market Master X-ec, www.sharefinder.com.au/marketmaster.php, pp. 1-5.

Ewars, C.C.; Bonus Chapter 7: Controlling Program Output and Input, TI-84 plus graphic calculator for dummies, Jun. 2004, pp. 1-8.

International Search Report for PCT/US05/06119.

Pending application for U.S. Appl. No. 10/787,481, filed Feb. 26, 2004.

Pending application for U.S. Appl. No. 11/415,967, filed May 2, 2006.

* cited by examiner

SYSTEM AND METHOD FOR CHANGING THE VIEW OF A TRADING SCREEN

RELATED APPLICATIONS

This application is a continuation of U.S. patent application Ser. No. 12/714,643 filed Mar. 1, 2010, now U.S. Pat. No. 7,917,428, entitled "System and Method for Changing the View of a Trading Screen," which is a continuation of U.S. patent application Ser. No. 11/415,967 filed May 2, 2006, now U.S. Pat. No. 7,769,671, which is a continuation of U.S. patent application Ser. No. 10/787,481 filed Feb. 26, 2004, now U.S. Pat. No. 7,761,362, the contents of which are fully incorporated by reference.

FIELD OF INVENTION

The present invention relates to electronic trading and more particularly, the present invention is directed to the axial display of market information.

BACKGROUND

Typically, an exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functionally rich way.

An electronic exchange generally sends messages to traders over a communication link. The data, in its raw form, sometimes includes things like an opening price, the price of the last trade, the quantity of the last trade, quantity available at the best sell price, quantity available at the best buy price, quantity available at additional buy and sell prices, and the closing price. Of course, an electronic exchange might include more or fewer items, often depending on the type of tradeable object or the type of exchange. Typically, the messages vary in size depending on the content carried by them, but at the receiving end, software is programmed to understand the messages and act out certain operations.

One particular, yet important, operation is preparing the information for display to the trader. The trading screen may be the only direct connection a trader has with the internal workings of an exchange. Until recently, however, market data was simply displayed on a trading screen in a manner similar to how it was received from the exchange without much customization or formatting. Because of the simplicity, the screens could be updated very quickly for a large number of tradeable objects, but at the expense of a non-intuitive design.

Now, developers are beginning to create sophisticated trading screens that provide a better adaptation to the screens intended use. For instance, according to one particular aspect, more attention has been given to analyzing what makes an effective trading screen, thereby resulting in the design of more intuitive displays and quicker order entry systems. Depending on the actual formatting and layout, however, some trading screens are more successful than others in conveying market information to the traders.

To develop an effective and intuitive screen, the developer should have an understanding and an appreciation for those who trade. More times than not, spotting an opportunity in a market and capitalizing on it before the competition can separate those traders who are successful from those traders who are not. An important component in capitalizing on an opportunity involves the efficient assimilation and processing of market information by the trader, in addition to reacting more quickly than other competing market participants.

In the following detailed description, novel features of a trading screen are described. These features provide advantages, as described below, to a trader in an electronic trading environment.

BRIEF DESCRIPTION OF THE DRAWINGS

Many aspects of the preferred embodiments may be better understood with reference to the following drawings. The components in the drawings are not necessarily to scale, emphasis instead being placed upon illustrating example embodiments.

DETAILED DESCRIPTION

Figure 1:
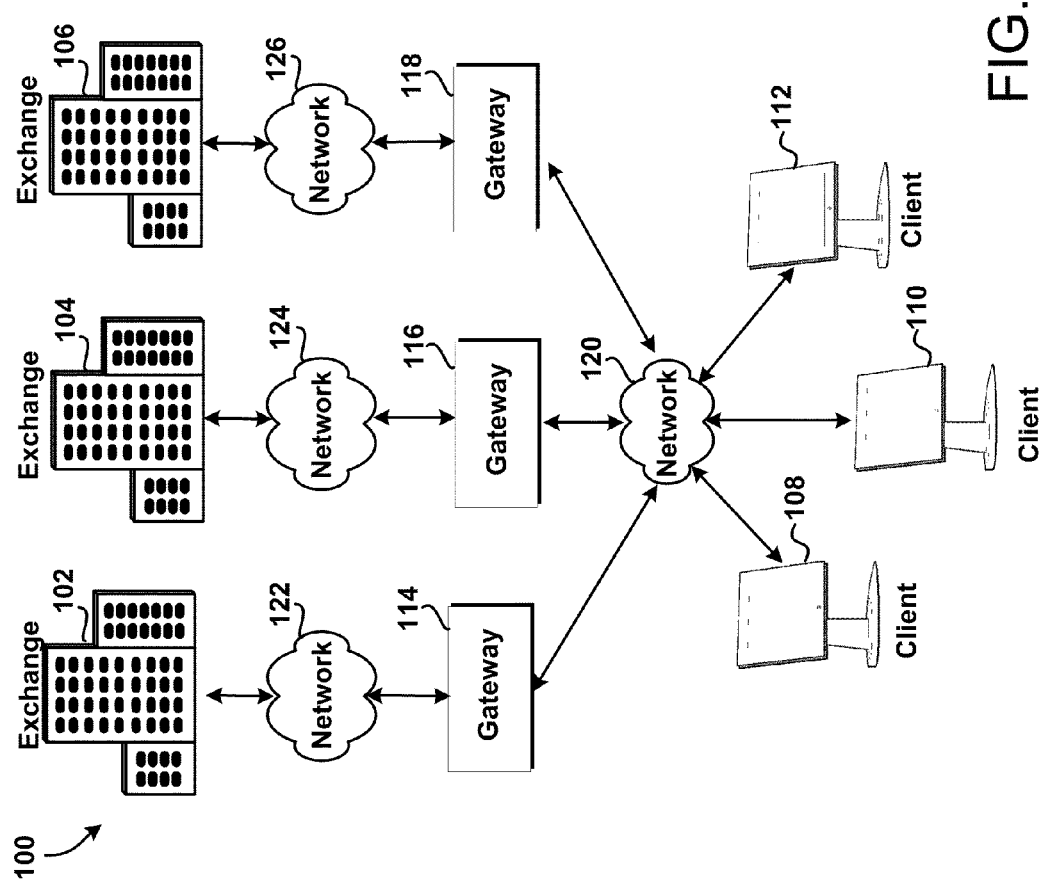
FIG. 1 illustrates an overview of an example system configuration, in accordance with the preferred embodiments, used to relay market information to a variety of trading terminals.

The preferred embodiments build on the price axis and recentering concepts described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display Of Market Depth And Price Consolidation," filed on Oct. 5, 2001, U.S. patent application Ser. No. 10/125,894, entitled "Trading Tools for Electronic Trading," filed on Apr. 19, 2002, U.S. patent application Ser. No. 10/376,417, entitled "A System and Method for Trading and Displaying Market Information in an Electronic Trading Environment," filed on Feb. 28, 2003, and U.S. patent application Ser. No. 10/609,965, entitled "Repositiong of Market Information on Trading Screens," filed on Jun. 30, 2003, the contents of each application above are incorporated by reference herein.

I. OVERVIEW

The preferred embodiments include methods, systems, and computer program products that may be put to advantageous use in an electronic trading environment. In particular, the preferred embodiments provide a feature that allows a user to select an area of interest on a trading screen and upon an indication from the user that a desired area of interest is selected, for example, by a click of the mouse button, contents of the display are moved to reposition the desired area of interest on the screen. The system and method work particularly well with trading screens that display market data, such as working orders, bid and ask quantities, and other indicators relative to a scale or axis.

A trading display can display only a certain amount of information, mostly because of the limitations of the actual screen or monitor size. In a trading display that uses an axis such that market information is displayed relative to the axis, various market indicators may ascend or descend the axis. While this type of trading display has many advantages over traditional trading screens (those that do not use an axis like the screens described herein), various pieces of market information might move relative to the axis and end up near the top or bottom of the display, or even go out of view. Using a conventional tool, such as the scroll bar, a trader can scroll up or down along the axis to view a particular portion of the axis, however, this method can cost a trader too much time or effort.

In contrast to conventional methods of view control like the scroll bar, the preferred embodiments allow a trader to quickly select an area of interest, such as a price level on an axis, and have that area of interest moved to a position approximately centered on the display (or to any other pre-defined location). So, for instance, if a trader is interested in a particular price, he or she can select the price through a single action of an input device, and the software preferably moves the axis (and the associated market information) such that the price is located approximately in the center of the display. Thus, providing a more desirable view of the axis.

Other systems, methods, features, and advantages of the preferred embodiments will be or become apparent to one with skill in the art upon examination of the following drawings and description. It is intended that all such additional systems, methods, features, and advantages be within the scope of the present invention, and be protected by the accompanying claims.

II. EXAMPLE TRADING SYSTEM

The system and method of the preferred embodiments are appropriate for use in any electronic trading environment. The example electronic trading system, comprising various elements, is described with the understanding that there are numerous equivalent elements and systems, all of which will be apparent to one of skill in the art.

FIG. 1 is a block diagram that illustrates an example electronic trading system 100. The electronic trading system 100 includes one or more electronic exchanges 102, 104, 106 and one or more client devices 108, 110, 112. In some instances, each of electronic exchanges 102, 104, 106 might use a different set of message specifications. Therefore, intermediate devices such as gateways 114, 116, 118, routers (not shown), and other such types of network devices may be used so that client devices 108, 110, 112 can recognize messages from and transmit messages to more than one electronic exchange, each of which might use a different message specification.

As indicated above, the preferred embodiments are not limited to any particular trading system configuration. For instance, networks 122, 124, 126 could represent the same network, network 120 could represent the same network as networks 122, 124, 126, or client devices 108, 110, 112 could connect directly to gateways 114, 116, 118. It is further understood that the preferred embodiments may be implemented with systems that have only one electronic exchange.

A. Electronic Exchange

In one embodiment, electronic exchanges 102, 104, 106 represent electronic trading platforms that preferably support electronic transactions of various kinds of tradeable objects. Examples of more sophisticated electronic trading platforms include the London International Financial Futures and Options Exchange (LIFFE), the Chicago Board of Trade (CBOT), the Chicago Mercantile Exchange (CME), the Exchange Electronic Trading ("Xetra," a German stock exchange), and the European Exchange ("Eurex").

In another embodiment, electronic exchanges 102, 104, 106 might also refer to other facilities, which include more basic systems that automatically match incoming orders. According to this embodiment, for instance, an electronic exchange 102, 104, 106 might simply refer to an online trading place where sports fans go to buy or sell seats for an event.

Each of the electronic exchanges 102, 104, 106 may host one or more computer-based electronic markets. Traders may connect to the one or more electronic markets to trade tradeable objects. As used herein, the term "tradeable objects," refers simply to anything that can be traded with a quantity and/or price. It includes, but is not limited to, all types of tradeable objects such events, goods and financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

An electronic market can implement any of the numerous types of order execution algorithms; sometimes the type of algorithm depends on the tradeable object being traded. By way of illustration only, some example order execution algorithms include price/time priority (also referred to as first-in-first-out or "FIFO") and pro rata-style algorithms. The FIFO algorithm, for instance, attempts to give priority to the first person to place an order. The pro rata algorithm, for instance, splits all (or most) orders for the same price at a particular point in time. The system and method of the present invention are not limited to any particular type of order execution algorithm.

It is further understood that an electronic market might include other software and/or hardware components to perform other tasks beyond matching orders or part of orders. These software and/or hardware components may be local or remote to the physical location of an electronic exchange. In other words, the components can be operated at the electronic exchange or at locations outside of the electronic exchange such as points of access. Points of access may include gateways or other fast computing devices that are nearby the electronic exchange and have access to other points of access near other electronic exchanges.

B. Gateway

In one embodiment, gateways 114, 116, 118 function as portals to a particular electronic exchange. Gateways 114, 116, 118 may include any computing device such as a mainframe, super minicomputer, minicomputer, workstation, or personal computer that connect network 120 to networks 122, 124, 126 so that market information may be successfully passed between client devices 108, 110, 112 and exchanges 102, 104, 106.

According to one aspect, gateways 114, 116, 118 preferably receive market data from exchanges 102, 104, 106 and convert it to a form compatible with the protocols used by client devices 108, 110, 112 using conversion techniques known in the art. Also, as known by those skilled in the art, gateways 114, 116, 118 may have one or more servers to support the data feeds, such as a price server for processing price information, an order server for processing order information, and a fill server for processing fill information. A trader at one of client devices 108, 110, 112 can preferably subscribe to price information, order information, and fill information for a particular electronic market hosted at exchanges 102, 104, 106. According to another aspect, gateways 114, 116, 118 preferably receive transaction information, such as orders, order changes, queries, etc. from client devices 108, 110, 112 and forward that information to corresponding exchanges 102, 104, 106.

In another embodiment, client devices 108, 110, 112 might connect to electronic exchanges 102, 104, 106 without the need for protocol translation (this embodiment is not shown in FIG. 1). For instance, a client device might have computer software that recognizes a particular exchange's protocol, and therefore, may have a direct connection to the electronic exchange.

It is further understood that gateways or similar types of computer-based devices may be used as points of access. Accordingly, client devices 108, 110, 112 may access an electronic exchange through a gateway, especially if the gateway(s) is used as a point of access in a network and/or at an electronic exchange.

C. Client Device

In one embodiment, client devices 108, 110, 112 function as an interface to trade at one or more electronic exchanges 102, 104, 106. Examples of client devices include a workstation, personal computer, laptop computer, hand-held computer, or any other computing device, large or small, that includes at least a display, processor and memory. The processor and memory, which are both well-known computer components, are not shown in the figure for sake of clarity.

It is understood that a display includes any visual output device of a client device. For sake of illustration to the reader only, examples include a CRT-based display, LCD-based display, a gas plasma-based display, or any other type of display device. For instance, the display device might be physically set on a desk top for a user to view, projected on a wall by a projector, or head mounted in special goggles.

It is further understood that a processor includes any device that, among other things, interprets and executes instructions. In other words, the processor functions as the "brains" of the client device. Processor may also encompass any components that make up the client device's main console to perform the functions described herein.

It is further understood that memory includes a device where information can be stored (temporarily or otherwise) on any computer readable medium and retrieved. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In one embodiment, depending on what tradeable objects are being traded, each of client devices 108, 110, 112 receive market information from one or more electronic markets hosted at any of electronic exchanges 102, 104, 106. Accordingly, market information is displayed to the trader(s) in a trading screen, in accordance with the preferred embodiments, on a visual output device or display device. A trader may also receive news to aid in analyzing information received from the exchange.

Upon viewing the market information or a portion thereof, a trader may wish to send orders to an exchange, cancel orders in a market, change orders in a market, query an exchange, and so on. To do so, the trader may input various commands or signals into the client device 104 through the trading screen, for example, by using one or more conventional means for inputting information such as typing into a keyboard, inputting commands through a mouse, or inputting commands or signals through some other input device.

Upon receiving one or more commands or signals, client devices 108, 110, 112 preferably generate transaction information. In addition to or in place of manual entry, a trader might use automated trading software that automatically or semi-automatically generates transaction information. Of course, there are many different types of messages and/or order types that can be submitted to an electronic exchange, all of which may be considered various types of transaction information. Once generated, for instance, transaction information is sent from client device 108 to host exchange 102 over network(s) 120 and 122.

II. SYSTEM FUNCTION AND OPERATION

As will be appreciated by one of ordinary skill in the art, various aspects of the preferred embodiments may be operated in an entirely software embodiment, in an entirely hardware embodiment, or in a combination thereof. In the interest of clarity, the preferred embodiments are described in a software embodiment based on a C or C++ language, or any other suitable programming language, which is executed on a computer device. As such, the preferred embodiments take the form of a computer program product that is stored on a computer readable medium and is executed by a suitable instruction execution system or processor in the computer device. Examples of computer readable medium were provided above.

It is understood that the description contained herein is considered as illustrative only of the various aspects of the preferred embodiments. Further, since numerous modifications and changes will readily occur to those skilled in the art, it is not desired to limit the present invention to the construction and operation shown and described, and accordingly, all suitable modifications and equivalents may be resorted to.

Figure 2:
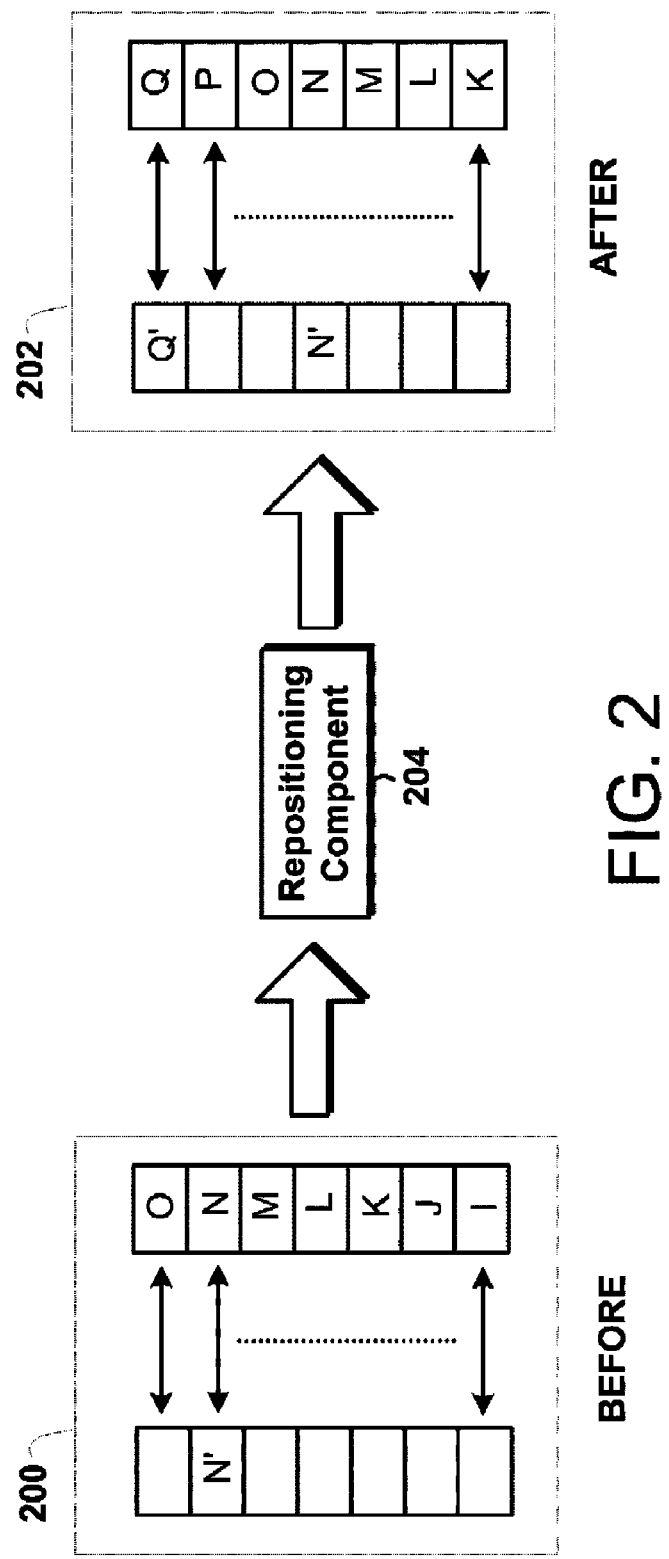
FIG. 2 illustrates a flow diagram of an example process for repositioning an axis in accordance with the preferred embodiments.

FIG. 2 shows a flow diagram for illustrating operation and function of a possible implementation of the preferred embodiments. In this regard, each block may represent a module, segment, or portion of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonable skilled in the art of the present invention.

Region 200 represents a section of a trading display at a particular point in time. Region 200 includes locations on a value axis for displaying indicators representing price or some derivative of price. As shown in FIG. 2, for purposes of illustration, one location has a value designated as "O," another value designated at "N," at "M," at "L," at "K," at "J," and at "I." The values "O" through "I" might represent prices, for instance. Market information can also be displayed in association with each value on the value axis. Market information might include working orders, bid and offer quantities, last traded quantity indicators, quantity by volume indicators, and so on. As shown in FIG. 2, the value designated as "N" has an indicator, designated as "N'" associated with it. "N'" might represent a working order, bid quantity, offer quantity, or any other indicator of market information.

It is understood that various aspects of the trading screen have been left out in FIG. 2 in the interest of clarity. It is further understood that actual prices and/or market information (real or synthetically created information) will preferably populate the various locations. An example with actual market information is provided below with respect to FIG. 3.

Now, assume that the value "N" and/or the market information around the value "N" is of particular interest to the trader. According to a preferred embodiment, to quickly center (or approximately center) on "N" and the information around "N," the location associated with "N" may be selected by a single-action of a user input device. As used herein, a single-action preferably refers to a single click of a mouse as a means for user input and interaction with the terminal display. While this describes a preferred mode of interaction, the scope of the present invention is not limited to the use of a mouse as the input device or to the click of a mouse button as the user's single-action. Rather, any action by a user within a short period of time, whether comprising one or more clicks of a mouse button or other input device, is considered a single-action of the user for the purposes of the present invention.

According to another instance of single-action, arrow keys on a computer keyboard may be used to highlight the particular value of interest, and then press enter or some equivalent key to select the location. In yet another instance, if a touch-screen is utilized, then by simply touching the location associated with the desired value can select the location.

Accordingly, repositioning component 204 receives the indication command and moves the value axis so that the value "N" is in the center (or approximately in the center) of the display, shown by region 202. Preferably, market information is also moved in unison with the values on the value axis. Therefore, the indicator "N'" is moved to a new location so that it can be properly associated with the value "N." Now, the trader can immediately focus on the value "N" and the information around "N." For instance, note that the value "A" has also moved to a new location on the screen. In other words, all of the values associated with the value axis, and their corresponding indicators, are moved accordingly. As a result, some values disappeared (e.g., represented by "J" and "K") while additional values are now displayed (e.g., represented by "Q" and "P") on the value axis to provide the trader with a different view associated with the value axis. Note that the value "Q" has an indicator "Q'" associated with it, which appears on the display only after the axis is repositioned.

It is understood that repositioning component 204 may be programmed to reposition the selected value to a location other than the center of the display. For instance, a trading display might have an even number of locations, therefore, the selected value might be moved to a near center position (e.g., one location above or below a center line). Note that the example trading display has an odd number of locations, and more specifically, shows seven locations. It is further understood that repositioning component 204 may be programmed to move the selected location only a certain number of units along the value axis. For instance, when a location associated with a value is selected, the value might be moved a programmed number of locations towards the center of the display. Preferably, the user can configure the repositioning component 204 to specify what location a selected value should be moved to in response to a repositioning command.

Accordingly, the user can preferably set parameters that are used in determining the precise movement through a graphical user interface ("GUI"). A GUI is a visual environment that preferably represents options with graphical images, such as icons, menus, and dialog boxes on a screen. The user may select and activate these options by pointing and clicking with a mouse, selecting them with a keyboard, or by setting them with some other input device. It is also possible to set such parameters through something other than a graphical user interface, such as through command-line entry or have them hard-coded into the software application.

As used herein, when the value axis is "moved," the software in a preferred embodiment is actually updating the screen by moving the values and market information to new locations on the screen so as to appear to the viewer that the axis has been "moved." One skilled in the art may fashion their software to provide the preferred movement.

III. EXAMPLES

For a more detailed understanding of a trading screen, a person of ordinary skill would know to refer to the above incorporated applications, and in particular, incorporated U.S. patent application Ser. No. 09/590,692, entitled "Click Based Trading With Intuitive Grid Display of Market Depth."

This incorporated application describes a static price axis or scale, such that the values on the price axis are not normally moved to different locations unless a recentering command is received. As such, market indicators, like the inside market, could move relative to the axis to provide the user with an intuitive view of the market. Recentering was also taught in the incorporated application by allowing a trader to select a designated area on the screen (or send a command via an input device) causing the inside market to be centered in the display. The preferred embodiments, disclosed herein, build on the recentering concepts by allowing a trader to select a particular area of interest on an axis, thereby causing that area to be centered (or near centered) or moved to another particular location on the axis in the display. Thus, a trader can view a particular portion of the axis without having to scroll up or down along the axis to view the item of interest. If so desired, both types of recentering techniques may be implemented in the preferred embodiments.

Figure 3:
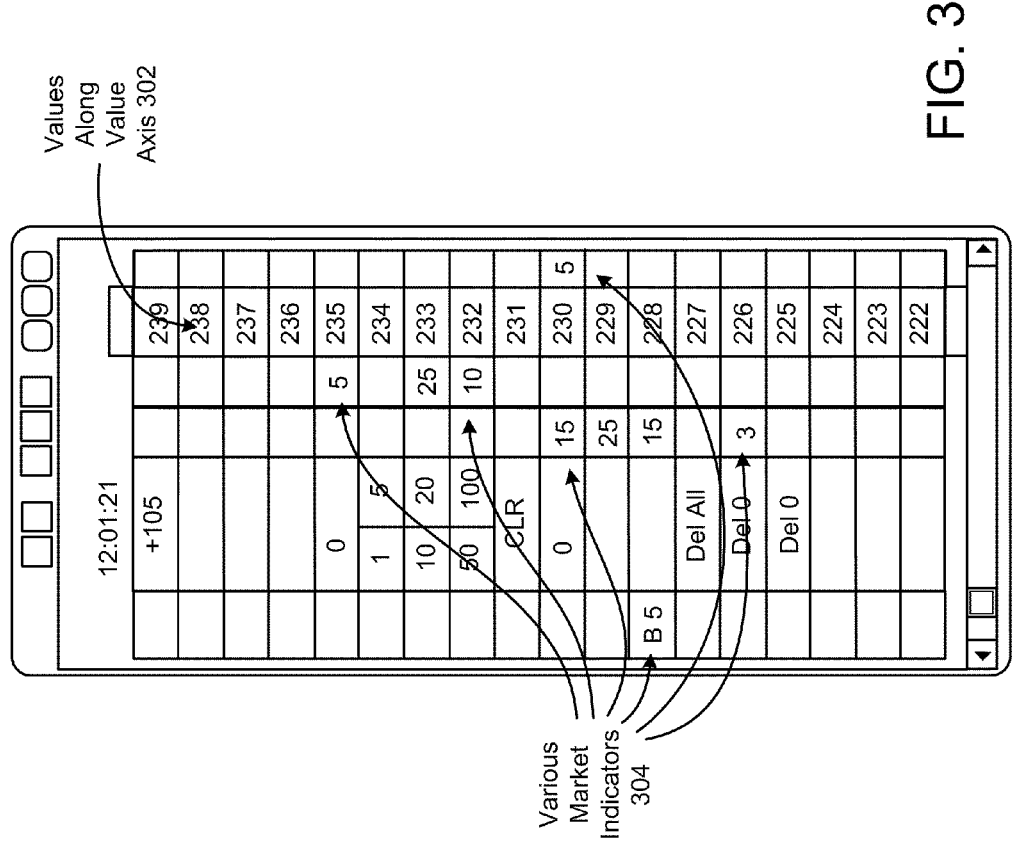
FIGS. 3-5 illustrate views of an example trading screen that are used to describe aspects of the preferred embodiments.

In FIG. 3, values are placed next to each other to form a series of values along axis 302. As shown, the series of values have a minimum value 304 and a maximum value 306, although this might not always happen. The arrangement of values can be in a column format, such as shown in FIG. 3, a row format, or any other desired format. The arrangement of values may also be aligned in a straight manner, such as shown in FIG. 3, or curved, whichever is more desirable.

Figure 4:
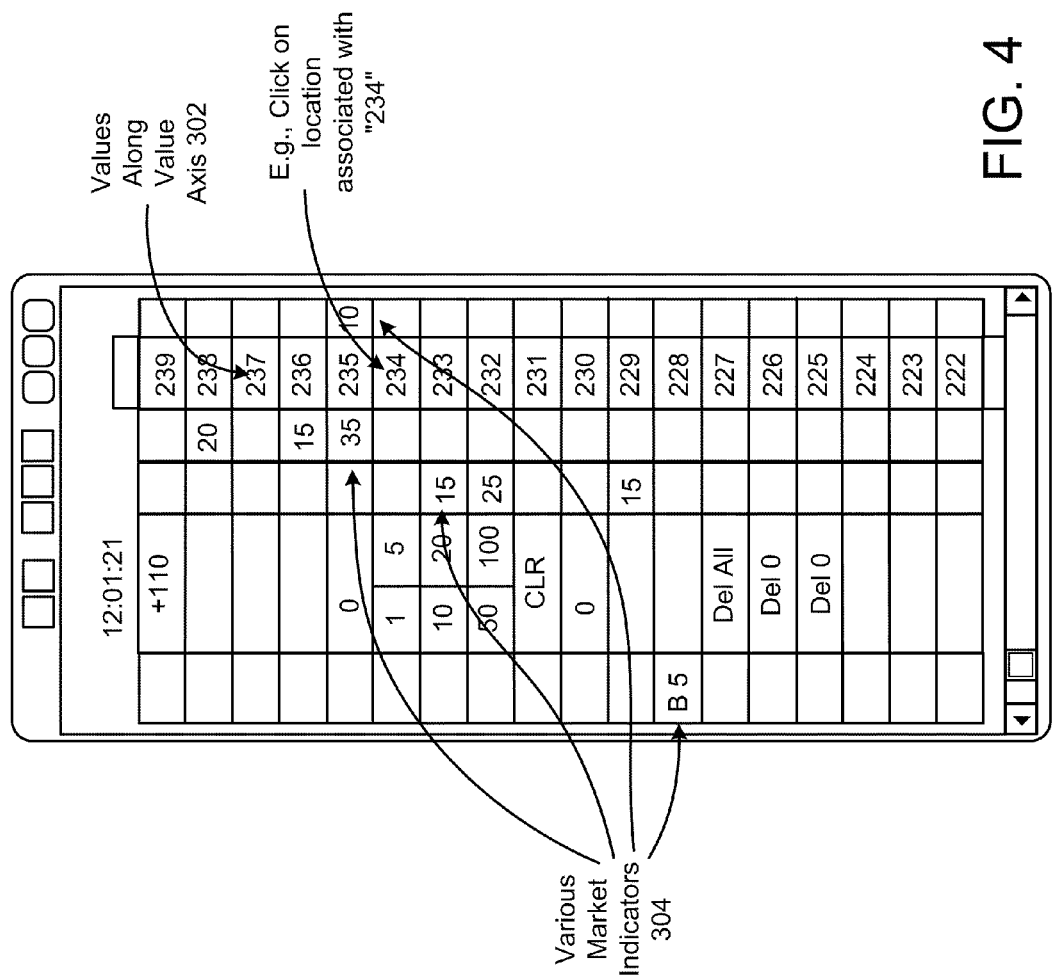

Irrespective of the actual axis format, market data is preferably mapped to corresponding values along the axis, such that working orders, bid quantities, ask quantities, and any other indicator can be easily viewed in association with their proper values. For instance, from the screen shown in FIG. 3 it can be easily seen that the current best bid price is "230" with an available quantity of "15." Whereas the current best offer price is "232" with an available quantity of "10." The next best bid price currently in the market is "229" with an available quantity of "25," and so on. Other indicators may also be shown in relation to the series of values on axis 302, such as the last traded quantity and working orders. From the screen shown in FIG. 3 it can be seen that the current last traded quantity is "5" at a price of "230," and a current working order is to buy "5" at a price of "228." As market data is updated, indicators 304 may move along the statically displayed series of values on axis 302. FIG. 4 shows an example when indicators 304 have moved along the series of values on axis 302.

Referring back to FIG. 3, values are displayed on value axis 302. The values might represent price in units of ticks, where a tick is minimum change in a price value that is set by the exchange for each tradeable object, or in some other unit of measurement. Values might instead represent net change, yield, volatility, or any other indicator which may be displayed along an axis. Market information, which is represented by market indicators 304, is displayed in association with the values on value axis 302. As indicated above, market information might include things like:

TABLE 1

| Types of Market Information Indicators | Examples shown in FIG. 3 |
|---|---|
| Working orders | An order to buy 5, "B 5" |
| Best bid quantity | "15" at a value of "230" |
| Best offer quantity | "10" at a value of "232" |
| Second best bid quantity | "25" at a value of "229" |
| Second best offer quantity | "25" at a value of "233" |
| Last traded quantity | "5" traded at a value of "230" |

FIG. 4 shows the example display of FIG. 3, only at some time in the future. Note that the values statically displayed on the value axis 302 have not moved, but the various market indicators associated with different values have moved. In other words, the market has changed such that various indicators are associated with different values on the value axis 302. Notice some indicators might not always move, such as the working order, because it remains associated with the value "228," which has not moved, until the trader moves or deletes the order. Table 2 below provides a summary of some of the example changes found between the state of the market in FIG. 3 and the state of the market in FIG. 4:

TABLE 2

| Types of Market Information Indicators | Changes shown in FIG. 4 |
|---|---|
| Working orders | Stayed at the same location |
| Best bid quantity | "15"; moved from "230" to "233" |
| Best offer quantity | "35"; moved from "232" to "235" |
| Second best bid quantity | "25"; moved from "229" to "232" |
| Second best offer quantity | "15"; moved from "233" to "236" |
| Last traded quantity | "10" traded at a value of "235" |

Now, according to this example, assume that a user is interested in viewing market information around the value "234." Accordingly, the user can quickly and simply move the cursor over the location associated with value "234," and select the location (e.g., by pressing a mouse button, etc.).

Figure 5:
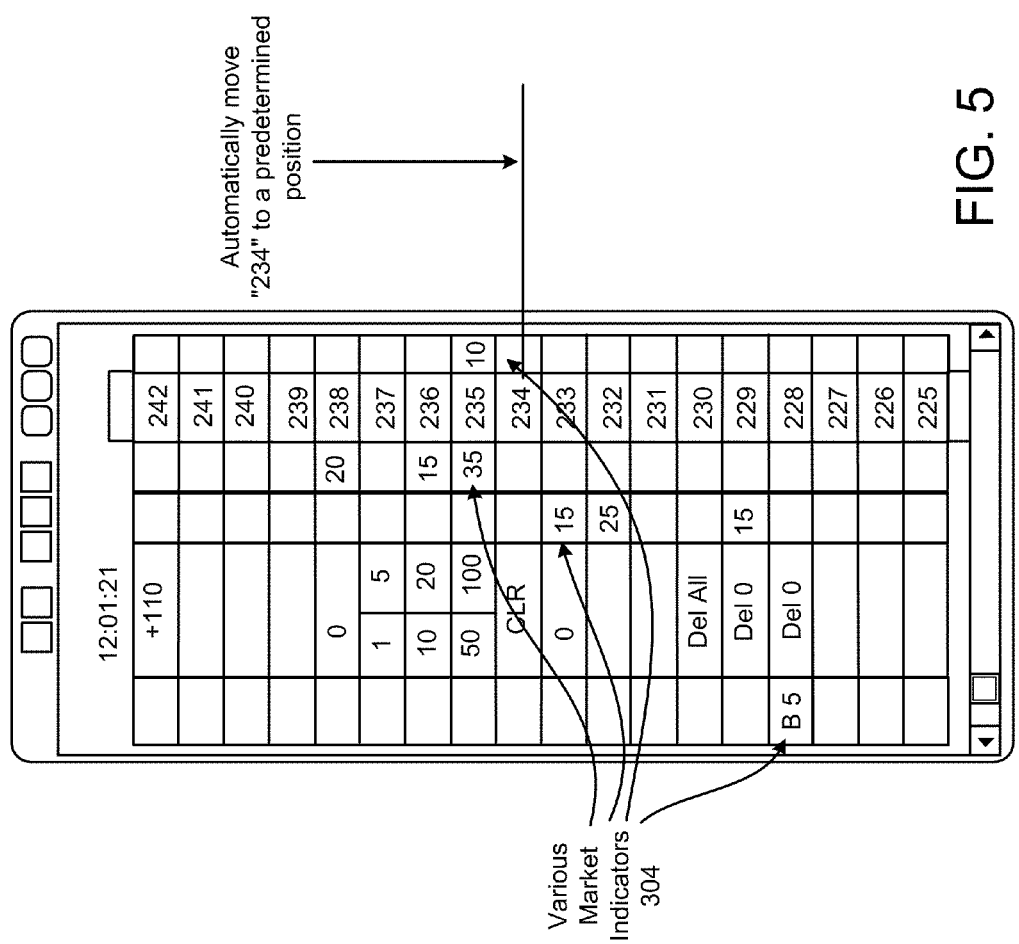

Automatically, repositioning component 204 receives the command and repositions the value axis 302 so the selected value is moved to a predetermined location, which in this example is the center (or near center) of the screen shown in FIG. 5. The movement may be quick enough so as the user could not view the move, but only the end result, or alternatively, the movement may be set to a slower rate so that the trader can actually see the values moving. In addition, market information represented by market indicators 304 are moved to locations that correspond to their previous values. For instance, the working order is moved to a new location associated with "228," best bid quantity is moved to a new location associated with "233," best offer quantity is moved to a new location associated with "235," and so on. By repositioning the value axis and market information, a trader can quickly and effectively view market information that may be of particular interest or out of view.

It is understood that the selected location may be moved to any designated location. In the above example, the selected value, along with any market indicators, were moved to the center (or near center). However, as indicated above, a trader may select a different location or simply restrict the movement by a certain number of units, for instance, such as limiting the movement to "5" locations. Also, as indicated above, the various selections may be input through a graphical user interface ("GUI"), which is a visual environment that preferably represents options with graphical images, such as icons, menus, and dialog boxes on a screen.

It is further understood that the market could change during the actual repositioning. If the market changes, the repositioning component can simply map the new market information, and more specifically, the market indicators to the proper values on the value axis.

IV. CONCLUSION

It is understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the teachings described herein.

It is further understood that a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A method for repositioning market information comprising:
  receiving a user command selecting a first price level associated with a location of a plurality of axially aligned locations displayed via a computing device according to market information for a tradeable object, where each location of the plurality of axially aligned locations is associated with a price level for the tradeable object; and
  in response to receiving the user command, triggering movement of the first price level relative to the plurality of axially aligned locations, where the first price level is moved to a predetermined location of the plurality of axially aligned locations via the computing device.

2. The method of claim 1 where the plurality of axially aligned locations is displayed on a display associated with the computing device.

3. The method of claim 1 where the market information comprises substantially real-time market information for the tradeable object.

4. The method of claim 1 where the plurality of axially aligned locations comprises a value axis.

5. The method of claim 4 where the value axis comprises a static price axis.

6. The method of claim 1 further comprising displaying a best bid indicator relative to the plurality of axially aligned locations according to the market information and a best ask indicator relative to the plurality of axially aligned locations according the market information, where the best bid indicator identifies a best bid value and the best ask indicator identifies a best ask value.

7. The method of claim 6 where the best bid indicator is displayed relative to a best bid location of the plurality of axially aligned locations associated with the best bid value and the best ask indicator is displayed relative to a best ask location of the plurality of axially aligned locations associated with the best ask value.

8. The method of claim 1 where an inside market for the tradeable object comprises the first price level.

9. The method of claim 1 further comprising submitting a trade order for the tradeable object in response to a selection of an order entry region.

10. The method of claim 1 where the predetermined location is substantially centered with the plurality of locations.

11. A non-transitory computer readable medium having computer executable instructions stored thereon, which when executed by a processor cause the processor to carry out steps comprising:
   receiving a user command selecting a first price level associated with a location of a plurality of axially aligned locations displayed according to market information for a tradeable object, where each location of the plurality of axially aligned locations is associated with a price level for the tradeable object; and
   in response to receiving the user command, trigging movement of the first price level relative to the plurality of axially aligned locations, where the first price level is moved to a predetermined location of the plurality of axially aligned locations.

12. The non-transitory computer readable medium of claim 11 where the predetermined location is substantially centered with the plurality of locations.

13. The non-transitory computer readable medium of claim 11 where the market information comprises substantially real-time market information for the tradeable object.

14. The non-transitory computer readable medium of claim 11 where the plurality of axially aligned locations comprises a value axis.

15. The non-transitory computer readable medium of claim 14 where the value axis comprises a static price axis.

16. The non-transitory computer readable medium of claim 11 further comprising submitting a trade order for the tradeable object in response to a selection of an order entry region.

17. A method of construing market information for a tradeable object comprising:
   displaying, via a computing device, a plurality of values along an axis in a display associated with a client trading device;
   displaying, via the computing device, a plurality of indicators relative to the plurality of values, where each of the plurality of indicators is associated with an order for a tradeable object pending execution at an electronic exchange, and where each indicator is displayed relative to an associated value of the plurality of values according to a value of the order associated with the indicator; and
   triggering, via the computing device, a new plurality of values in the display where a selected and identified location of the axis is repositioned to a predetermined location of the display region in response to a command selecting and identifying the location.

18. The method of claim 17 wherein the predetermined location comprises a substantially vertically centered location relative to the display region.

19. The method of claim 17 where the selected and identified location comprises a location for an item of interest.

20. The method of claim 18 where the item of interest comprises an inside market for the tradeable object.

21. The method of claim 17 where the plurality of values along an axis comprises a static value axis.

* * * * *